Nov. 11, 1958     G. M. SALAMONOVICH     2,860,293

SERVO OVERTRAVEL CORRECTING SYSTEM

Filed Sept. 19, 1955

GEORGE M. SALAMONOVICH
INVENTOR.

BY

ATTORNEY

United States Patent Office 2,860,293
Patented Nov. 11, 1958

2,860,293

SERVO OVERTRAVEL CORRECTING SYSTEM

George M. Salamonovich, Hollywood, Calif., assignor to Gilfillan Bros. Inc., Los Angeles, Calif., a corporation of California Application September 19, 1955, Serial No. 534,936

13 Claims. (Cl. 318—28)

This invention relates to self-balancing systems and more particularly to a device for limiting the over-travel of a null seeking servo mechanism.

While the present invention has utility in many fields, it is particularly useful in limiting the over-travel of a type of motor driven potentiometer which is very frequently used in follow-up systems.

In a typical servo mechanism arrangement two or more input signals are combined in accordance with a predetermined function which is amplified and employed to drive a motor. The motor is employed to position a tap on an impedance element, such as a potentiometer, which supplies one of the input signals to the combining circuit. That tap is thus moved until the servo reaches a null with its given input signals.

Frequently the relative magnitudes of the input signals of this type of servo mechanism are such that the servo motor tends to drive the movable potentiometer tap beyond one end of the potentiometer. One technique of preventing this has been to position mechanical stops at the extreme limits of the potentiometer winding to prevent the movable tap from proceeding beyond those points. This technique requires the further provision of a slip clutch for the motor in order to prevent the mechanical stops from being deformed or broken, and to prevent the motor from being critically overloaded. As a result, these over-travel limiting devices are relatively intricate and expensive, but yet rather inefficient.

An alternative over-travel arrangement is shown in U. S. Patent No. 2,575,151 which includes mercury switches that are operated by the movable potentiometer tap when the tap is disposed at the opposite ends of the potentiometer winding. The mercury switches are thus employed to disengage the motor which moves the tap. This arrangement is disadvantageous in that it operates discontinuously; that is, when the motor is disengaged due to an over-travel, other means must be provided to re-engage it when the servo input signals no longer tend to cause potentiometer over-travel. Furthermore, the system is still unnecessarily elaborate for solving the problem of potentiometer over-travel efficiently.

Another over-travel compensating technique shown in U. S. Patent No. 2,523,509 employs bucking voltages that may be impressed upon the movable potentiometer tap at its extreme limits of travel to reduce the exciting voltage of the motor to which the tap may be connected directly. This technique however is also unnecessarily complicated.

The above-described and other disadvantages of the prior art are obviated by the present invention by providing a boundary voltage beyond which a movable impedance tap is prevented from assuming.

In particular, a potentiometer having a movable tap and at least one stationary tap is provided in accordance with one embodiment of the invention in a null-seeking servo mechanism. A source of potential is then impressed across the portion of the potentiometer winding from the stationary tap to one end of the potentiometer to cause the servo to reach a null, the potentiometer tap stopping at least at one point on that portion of the poentiometer winding. The servo will in fact always reach a null when the magnitude of the voltage impressed across the auxiliary winding is sufficiently large and of a suitable polarity.

The servo over-travel limiting device of the present invention thus incorporates only the additional component of a source of potential which may operate efficiently and continuously to cause a servo mechanism to reach a null always at a point on the auxiliary impedance element.

It is therefore an object of the invention to provide an improved over-travel limiting device suitable for use in a servo mechanism.

Another object of the invention is to provide a highly efficient over-travel limiting device suitable for use in a servo mechanism.

Still another object of the invention is to provide an electrical servo over-travel limiting device requiring a few inexpensive components.

It is a further object of the invention to provide a continuously operative over-travel limiting device suitable for use in a null seeking servo mechanism.

It is a still further object of the invention to provide a continuously operative over-travel limiting device for causing a servo mechanism to reach a null for any range of input voltages.

These and other objects and advantages of the present invention will be better understood when considered with the following description taken in connection with the accompanying drawings made a part of this specification wherein several embodiments are illustrated by way of example. The device of the present invention is by no means limited to the specific embodiments illustrated in the drawings since they are shown merely for purposes of description.

Figure 1:
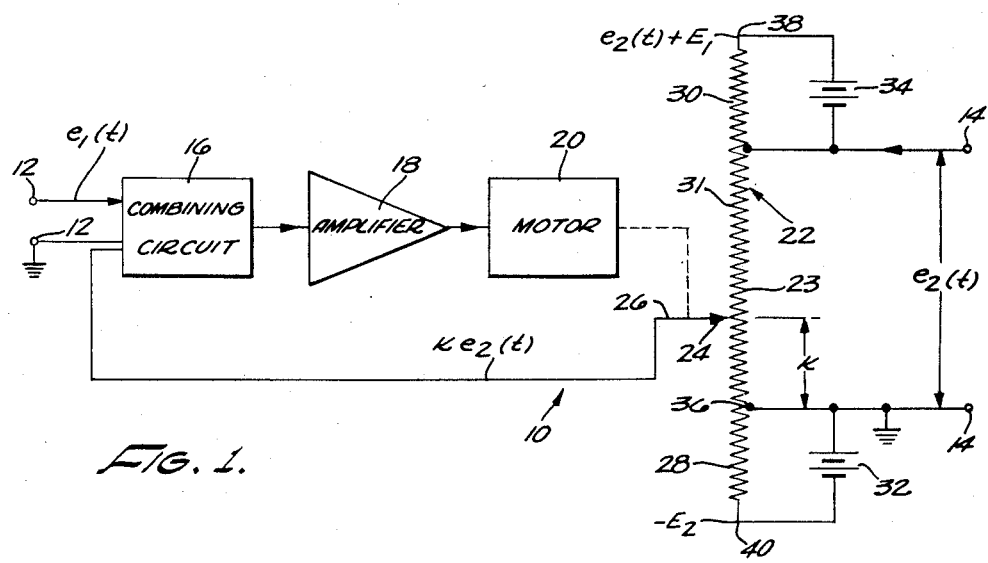
Fig. 1 is a partial schematic diagram of the over-travel limiting device of the present invention.

In the drawing in Fig. 1 a servo mechanism 10 is shown having two pairs of input terminals 12 and 14 between which voltages $e_1(t)$ and $e_2(t)$ are impressed, respectively. A combining circuit 16 is connected to input terminals 12. An amplifier 18 is connected to combining circuit 16 and amplifier 18 is connected to a motor 20. A potentiometer 22 is shown provided with a resistive winding 23 and a movable tap 24 connected to a movable contact arm 26 to which motor 20 is mechanically connected. Combining circuit 16 is then electrically connected from movable tap 24 of potentiometer 22.

The points at which input terminals 14 are connected to potentiometer 22 are fixed taps but may be called limit point. Two end portions 28 and 30 of the winding 23 are adapted so that the tap 24 will move in sliding engagement therewith as it does on a principal portion 31 thereof. A source of potential 32 is connected across resistive winding 28 and a source of potential 34 is connected across resistive winding 30. If $e_1$ and $e_2$ are voltages varying with time and the magnitude of the voltages impressed upon end portions 28 and 30 of the winding 23 are of an appropriate value, the tap 24 and the potentiometer 22 will never over-travel the end portion 28 and 30. That is, based upon the expected maximum deviations of $e_1$ and $e_2$, the sources 32 and 34 may be selected to have a large enough voltage to cause the output of combining circuit 16 to be zero when the movable tap 24 is disposed in contact with one of the end portions 28 or 30.

K is a factor proportional to the distance from one tap 36 of the potentiometer 22 to a point on the potentiometer 22. The voltage at the tap is thus $Ke_2(t)$. The servo mechanism operates to sum $e_1(t)+Ke_2(t)$ when combining circuit 16 is a summing circuit. This sum is amplified and applied to drive the motor 20 to move the contact arm 26 on the potentiometer 22 to a point where $e_1(t)+Ke_2(t)=0$. If $E_1$ is the voltage impressed upon resistive winding 30 and $E_2$ is the voltage impressed upon resistive winding 28, then the potential of an outer end 38 of the resistive winding 30 is $e_2(t)+E_1$ and the potential of a side 40 of the resistive winding 28 is $-E_2$. Thus if $E_1$ is always larger than the value of $e_1(t)-e_2(t)$ and $E_2$ is always larger than $e_1(t)$ for any value of $t$, then the servo mechanism 10 will always reach a null at some point at least on end portions 28 or 30.

Figure 2:
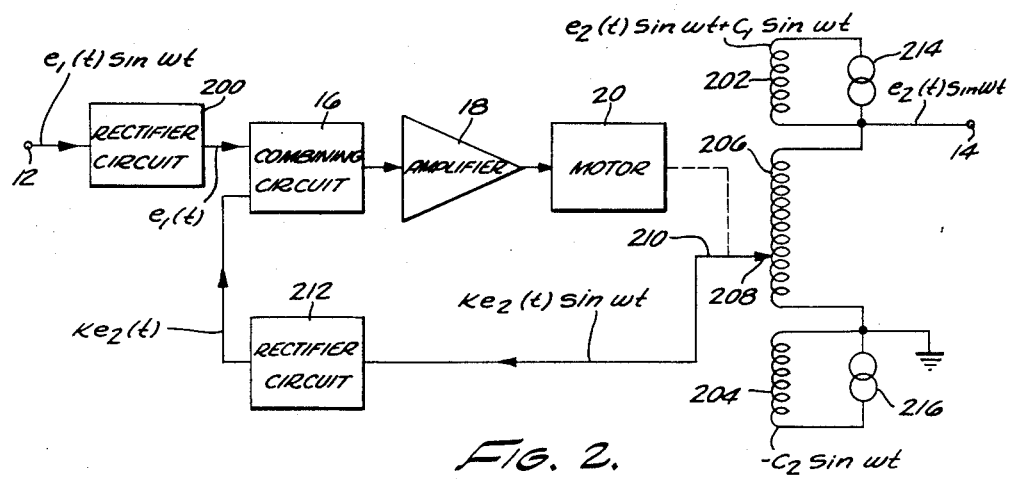
Fig. 2 is an alternative embodiment of the invention shown in Fig. 1.

The present invention is by no means limited to a potentiometer but may be applied to inductive windings having movable taps thereon or means providing distributed series capacitance. Inductive windings are shown in Fig. 2 where terminals 12 and 14 are again shown with combining circuit 16, amplifier 18, and motor 20. A first rectifier circuit 200 is provided between input terminal 12 and summing circuit 16 in order that an alternating voltage $e_1(t)\sin\omega t$ may be detected and the voltage $e_1(t)$ produced. The servo may operate satisfactorily with alternating voltages and for this reason the rectifier circuits 200 and 212 may alternatively be omitted. It is to be noted further that the rectifier circuits are principally phase detectors which are employed to preserve the relative polarities or algebraic signs of the input signals.

Two auxiliary inductive windings 202 and 204 are shown disposed on each side of a principal inductive winding 206 in Fig. 2. The principal inductive winding 206 is provided with a movable contact 208 which may be disposed in sliding engagement with any of the inductive windings 202, 204 or 206. Movable tap 208 is connected to a movable contact arm 210 which is connected to the motor 20 mechanically. Movable tap 208 is connected to a second rectifier circuit 212 to combining circuit 16 to provide an output voltage $Ke_2(t)$. An input voltage is provided at second input terminal 14 which is $e_2(t)\sin\omega t$. Two alternating voltage generators 214 and 216 are then connected across auxiliary inductive windings 202 and 204.

It is to be noted that the voltage at the outer terminals of inductive windings 202 and 204 respectively are $e_2(t)\sin\omega t+C_1\sin\omega t+C_2\sin\omega t$, respectively, $C_1$ and $C_2$ being positive constants.

It is to be noted that auxiliary windings 202 and 204 need not be inductively coupled with each other nor with principal inductive winding 206 although they may be if parameters are appropriately chosen. Alternatively, all three of the windings may be formed in a single autotransformer unit. In this case the relationship $$\frac{C_1}{C_2}=\frac{T_{c1}}{T_{c2}}$$

is preferably maintained where $T_{c1}$ and $T_{c2}$ are the turns on the windings 202 and 204 respectively.

The operation of the servo mechanism of Fig. 2 in principle is the same as that of Fig. 1 except that changed components are added or substituted to accommodate the alternating input voltages appearing at input terminals 12 and 14 which vary in amplitude according to the input signals $e_1(t)$ and $e_2(t)$.

Figure 3:
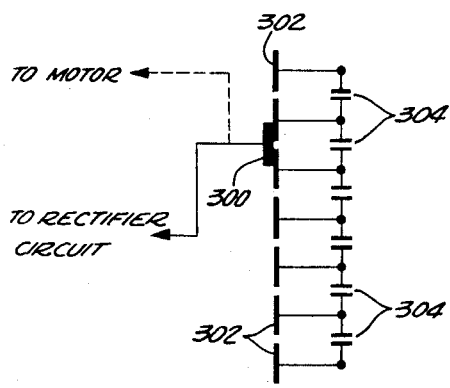
Fig. 3 is an alternative embodiment of the impedance element shown in Fig. 2.

An alternative embodiment of the invention is shown in Fig. 3 where a movable contact 300 is shown disposed in sliding engagement with a plurality of conductors 302 between which are connected a plurality of capacitors 304. An alternating voltage divider is thus provided in Fig. 3 which incorporates distributed series capacitance.

What is claimed is:
1. In a null seeking servomechanism incorporating an impedance element having a positionable tap, the combination comprising: at least one fixed input tap on said impedance element disposed a relatively short distance from one extremity of said impedance element and a source of bias voltage connected between said fixed input tap and said extremity, said positionable tap being capable of traversing the extremity of said impedance element, thereby sensing a voltage which is related to said bias voltage.

2. In a null seeking servomechanism including a principal impedance element having a movable tap, means to impress a first input voltage across said principal impedance element, and means to move said tap to a position on said principal impedance element a distance from one end thereof proportional to the magnitude of a second input voltage, the combination comprising: at least one auxiliary impedance element having one end electrically connected from one end of said principal impedance element and positioned adjacent said principal impedance element to be contacted by said movable tap, and means for impressing a bias voltage across said auxiliary impedance element in a manner such that the rate of change of the magnitude of the voltage on said auxiliary impedance element with respect to the distance from said one end thereof has the same algebraic sign as that of the rate of change of the magnitude of the voltage on said principal impedance element from its other end, the magnitude of said bias voltage being sufficiently large to prevent said movable tap from over traveling the other end of said auxiliary impedance element for the maximum expected variations of said input voltages.

3. The invention as defined in claim 2 wherein the magnitude of said bias voltage is more positive than the maximum expected magnitude of said second input voltage minus the minimum expected magnitude of said first input voltage.

4. The invention as defined in claim 2 wherein the magnitude of said bias voltage is more negative than the minimum expected magnitude of said second input voltage plus the maximum expected magnitude of said first input voltage.

5. The invention as defined in claim 2 wherein said impedance elements are resistive impedance elements.

6. In a null seeking servomechanism, the combination comprising: a potentiometer having a movable tap on a resistive winding, and a source of direct-current voltage connected from each end of said winding to respective spaced, fixed, input taps on said winding.

7. In a null seeking servomechanism including a combining circuit and an impedance element having a movable tap and a pair of input taps, a first input signal $e_1(t)$, a feedback signal $Ke_2(t)$ being derived through said movable tap and combined into a single output signal in the combining circuit, K being a factor determined by the position of said movable tap, and $e_2(t)$ being applied to one input tap as a second input signal, the combination comprising: means for impressing a limiting signal across one end of the impedance element, said signal having a magnitude selected to limit the travel of the movable tap; the magnitude of said limiting signal being large enough to reduce the expected maximum output signal of said combining circuit to zero as computed by the expected maximum deviations of the input signals $e_1(t)$ and $e_2(t)$.

8. A servomechanism comprising: a potentiometer having first and second input taps and a movable tap disposed in contact with a resistive winding; a combining circuit for algebraically combining a first input signal $e_1(t)$ and a feedback signal $Ke_2(t)$ appearing at said movable tap, K being a function of the position of said movable tap and $e_2(t)$ being a second input signal which is applied to said first input tap, said second input tap being maintained at a predetermined reference potential;

a motor responsive to the output signal of said combining circuit for positioning said movable tap; and means for impressing a voltage across one end of said resistive winding having a magnitude sufficient to reduce the output of said combining circuit to zero when said movable tap is disposed in contact with said end of said resistive winding for the maximum expected deviations of said input signals $e_1(t)$ and $e_2(t)$.

9. A servomechanism having at least first and second input terminals, said servomechanism comprising: an algebraic summing circuit responsive to signals appearing at said first input terminal, an amplifier for producing an output voltage in response to the output voltage of said summing circuit; a motor responsive to the output signal of said amplifier, a potentiometer having a movable tap disposed in contact with a resistive winding, said motor being mechanically connected to said movable tap, said movable tap being electrically connected to said summing circuit; and means providing a source of direct-current voltage connected from each end of said resistive winding to first and second spaced input taps on said winding.

10. A servomechanism comprising first and second input terminals, a first detector connected from said first input terminal, a summing circuit for providing an output voltage responsive to the output voltage of said first detector, an amplifier for providing an amplified output voltage of the output voltage of said summing circuit, an inductive winding having a movable tap disposed in sliding engagement therewith, a motor connected from said amplifier to said movable tap for moving said movable tap in response to the output voltage produced by said amplifier, said movable tap being connected to a second detector, said second detector being in turn connected to said summing circuit, and means for impressing a voltage from each end of said inductive winding to first and second spaced input terminals.

11. A servomechanism comprising first and second input terminals, a first rectifier circuit connected from said first input terminal, a summing circuit for providing an output voltage responsive to the output voltage of said first rectifier circuit, an amplifier for providing an amplifier output voltage of the output voltage of said summing circuit, a principal impedance element having a movable tap disposed in sliding engagement therewith, a motor connected from said amplifier to said movable tap for moving said movable tap in response to the output voltage produced by said amplifier, said movable tap being connected to a second rectifier circuit, said second rectifier circuit being in turn connected to said summing circuit, two auxiliary impedance elements connected from said principal impedance element and positioned to be in sliding engagement with said movable tap and means for impressing a voltage across said auxiliary impedance elements, said principal impedance element having one end connected to a point of reference potential and its opposite end connected to said second input terminal.

12. The invention as defined in claim 11, wherein said impedance elements are means providing distributed series capacitance.

13. A device for limiting the movement of the variable element of a potentiometer, the variable element being driven in accordance with a predetermined driving function of an input signal and a feedback signal, derived through said variable element, said device being arranged to prevent the tendency to drive said variable element beyond a limit point on the potentiometer, said device comprising: first means for applying a second input signal at an input point on said potentiometer before said limit point, and second means for impressing a boundary signal at said limit point, said boundary signal being selected to cause said predetermined driving function to assume a null condition when said variable element is positioned at some point between said input point and said limit point.

References Cited in the file of this patent

UNITED STATES PATENTS

| | | |
|---|---|---|
| 2,452,311 | Markusen | Oct. 26, 1948 |
| 2,760,131 | Braunagel | Aug. 21, 1956 |
| 2,781,482 | Montgomery | Feb. 12, 1957 |